March 21, 1933.  W. P. FROST  1,902,161
SUSPENSION DEVICE FOR EQUALIZING THE STRAIN ON ELEVATOR CABLES
Filed Jan. 10, 1931  3 Sheets-Sheet 1
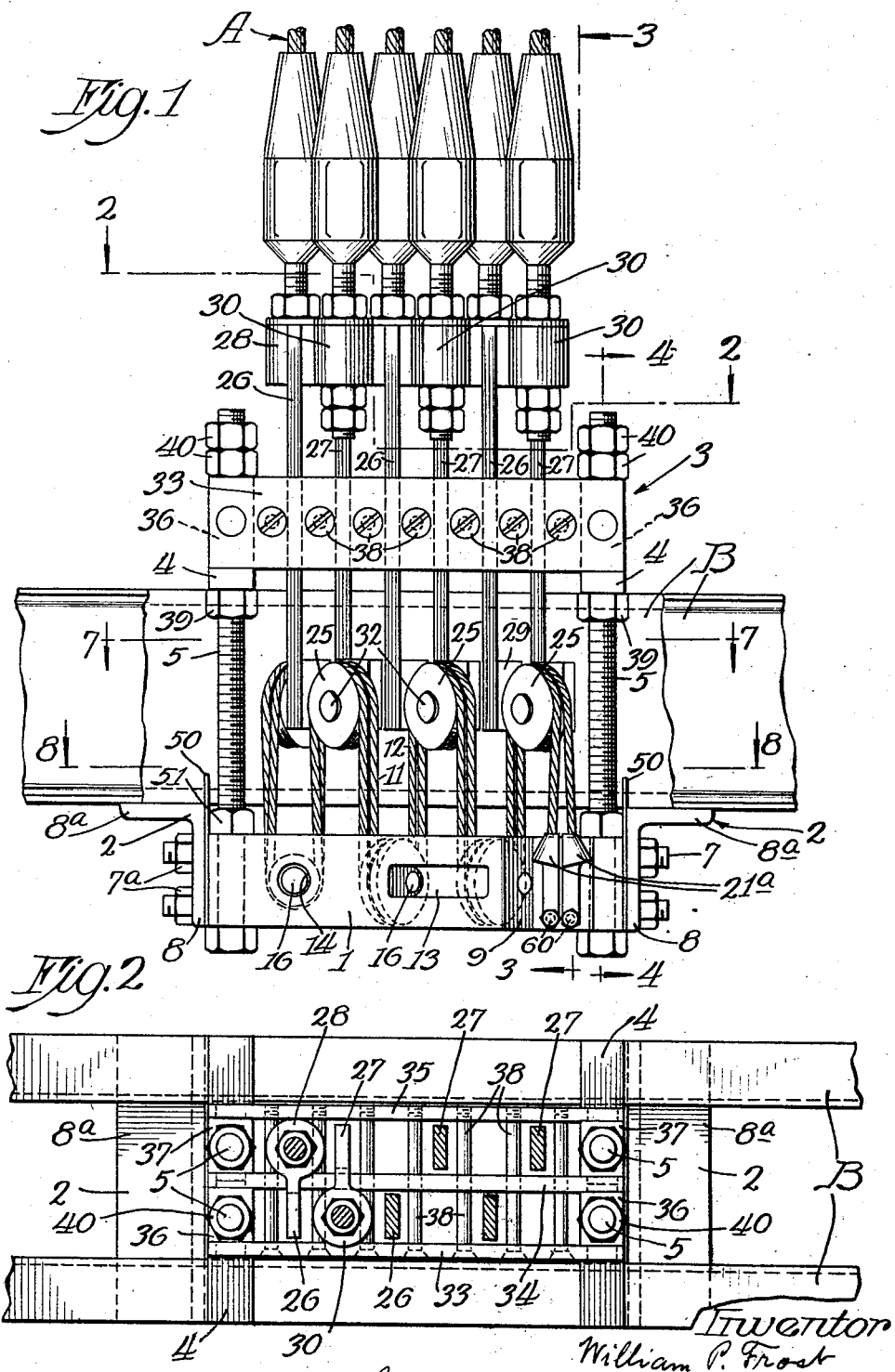

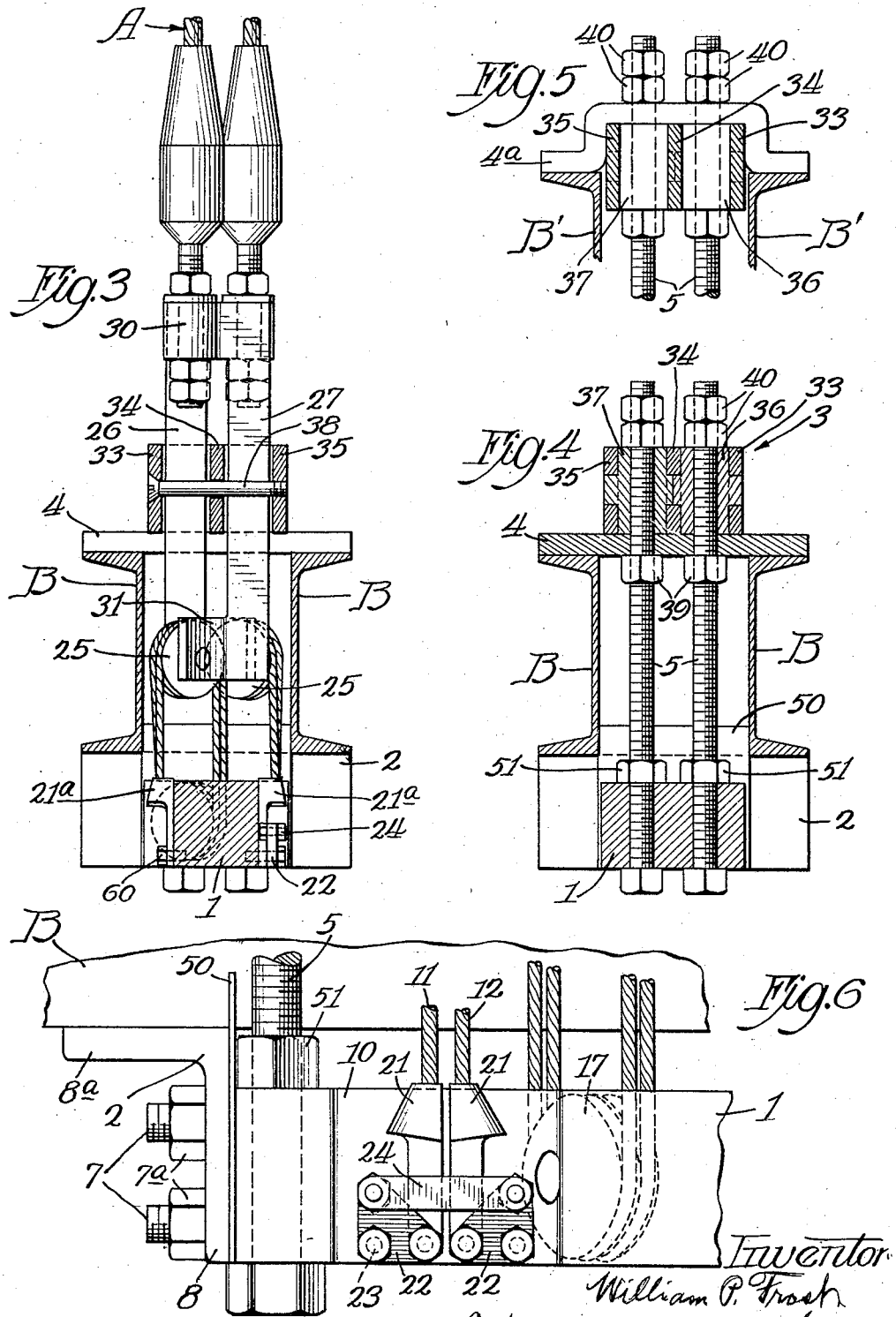

March 21, 1933.  W. P. FROST  1,902,161
SUSPENSION DEVICE FOR EQUALIZING THE STRAIN ON ELEVATOR CABLES
Filed Jan. 10, 1931   3 Sheets-Sheet 3
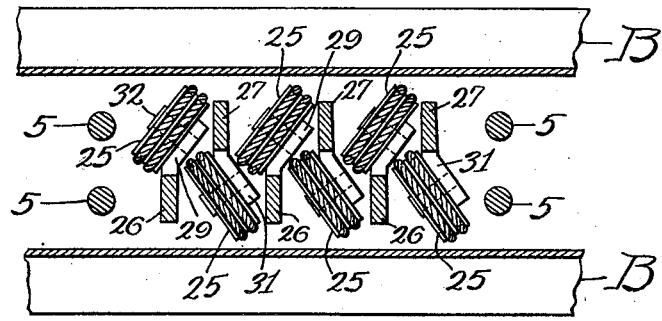
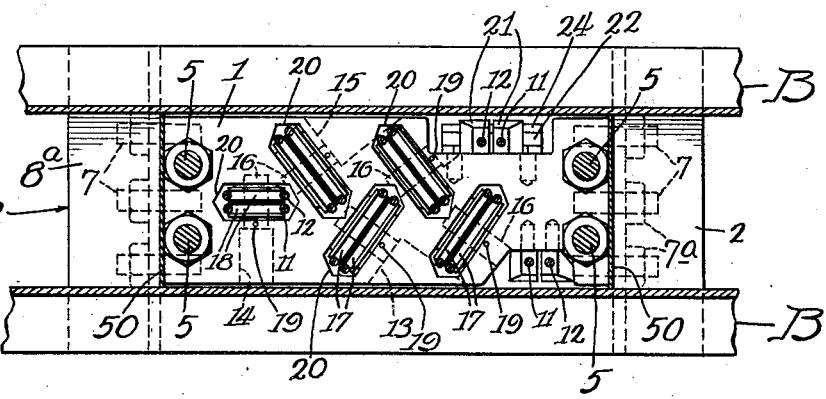
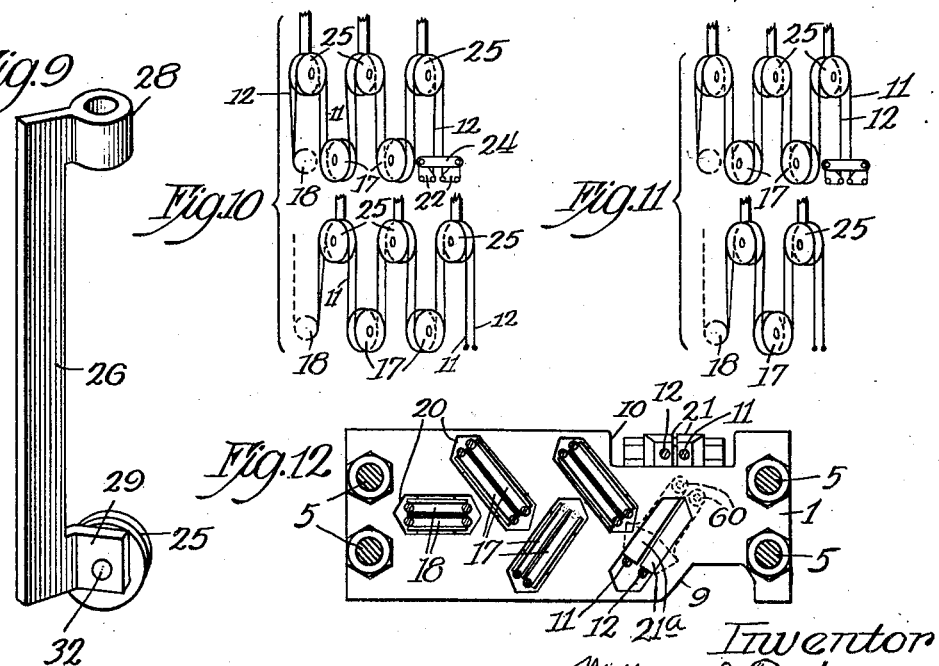
Inventor
William P. Frost
By Rector, Hibben, Davis & Macauley
his Attys.

Patented Mar. 21, 1933

1,902,161

UNITED STATES PATENT OFFICE

WILLIAM P. FROST, OF JACKSON HEIGHTS, NEW YORK, ASSIGNOR TO EVANS ELEVATOR EQUALIZER COMPANY, OF BEDFORD, INDIANA, A CORPORATION OF INDIANA

SUSPENSION DEVICE FOR EQUALIZING THE STRAIN ON ELEVATOR CABLES

Application filed January 10, 1931. Serial No. 507,967.

My present invention relates to improvements in the type of equalizing suspension devices used as a connection between a plurality of cables and an elevator car such as is used for transporting passengers or freight to and from the different floors of buildings, especially buildings of great height. My novel equalizing device may also be used to connect the counterweight end of the cables to the counterweight which according to general practice is employed to counterbalance the weight of the car. It is the object of my invention to provide a desirable and serviceable suspension device serving to equalize the strain between the cables of the group and which, by reasons of certain novel features of construction shall possess advantages not heretofore realized in the way of compactness, convenience of manufacture and assembly into complete devices prior to installation, capacity for installation of assembled devices in elevator cars with minimum disassembling at the time of installation, ready adaptation for installation in elevators of different construction with respect to the dimension and arrangement of cross-head members of the car with but slight modification of the parts of the equalizer structure through which it is secured to the car, a novel arrangement of the suspension and equalizing pulleys and flexibility and consequent sensitiveness of the equalizing cable employed, avoidance of liability to friction which hinder the functioning of the parts and are inherent in equalizers of the same type heretofore known, and various novel and useful details in the construction and arrangement of parts which I have devised for the purpose of attaining the objects in view. In the accompanying drawings I have illustrated in detail my novel suspension device, and will fully describe the same in the specification which follows, the essential elements of my invention being more particularly pointed out in the appended claims.

In the drawings, Figure 1 is a side view of my novel suspension device;

Fig. 2 is a horizontal section of the same in a plane indicated by the dotted line 2—2 of Fig. 1;

Fig. 3 is a vertical cross-section in a plane indicated by the dotted line 3—3 of Fig. 1;

Fig. 4 is a vertical cross-section in a plane indicated by the dotted line 4—4 of Fig. 1;

Fig. 5 is a vertical cross-section corresponding to the upper portion of Fig. 4, but illustrating a modified form of certain members;

Fig. 6 is a detail illustrating an equalizing connection for anchoring one end of the pair of equalizing cables employed;

Figs. 7 and 8 are horizontal sections in planes indicated by the dotted lines 7—7 and 8—8, respectively, of Fig. 1;

Fig. 9 is a perspective of one of the pull bars of the device;

Fig. 10 is a diagrammatic view illustrating the arrangement and relationship of the equalizing cable with respect to the suspension and equalizing pulleys;

Fig. 11 is a similar diagrammatic view of a modified arrangement in which but five suspension cables are employed; and Fig. 12 is a view corresponding to Fig. 8 but illustrating the modified arrangement employing five suspension cables only.

Like reference characters indicate like parts in all the figures of the drawings.

It will be understood that my invention is designed to be applied to elevator installations of the type in extensive and well nigh universal use employing a group of cables which travel around a suspension pulley arranged at the top of the elevator shaft and which at one end are attached to the elevator car and at the other to the counterbalance, suitable power means being employed to rotate the suspension pulley, or apply power to the cables in other suitable manner to simultaneously either hoist the car and lower the counterweights, or cause movement of such parts in the opposite direction. Inasmuch as various forms of arrangement of the elements mentioned are in common use and well known in the art, it is deemed unnecessary to illustrate them, and my invention will be described with reference to a group of suspension cables, the ends only of which, marked A, are shown. These cables, by means of my novel equalizing device, are connected to the cross-head members of an elevator car, only the cross-head members of which, marked B (or B′) are illustrated in the drawings, it also being considered unnecessary to illustrate the remaining parts of the car, which may be assumed to be of usual or suitable construction.

The cross-head members B of the car, it may first be explained, usually consist of a pair of structural iron channel members which in different makes and styles of elevators differ somewhat in size and spacing, but in practically all cases extend transversely across the car at the top thereof and provide the means for attachment of the car to the group of suspension cables. The clearance of the car at the top of the elevator shaft between the cross-head channels and the suspension pulley is frequently small, and for this reason it is desirable that the vertical dimensions of the connecting device shall be as small as practicable and that the points of connection of the cables with the car shall, if the cables spread oppositely at all, depart but slightly from the vertical plane which passes through the suspension point of the cables at the periphery of the suspension pulley.

First describing generally the construction of my novel suspension device, the frame of the device includes a base-block 1 in which the suspension sheaves or pulleys hereinafter mentioned are supported and which is arranged beneath the cross-head channels B. lower clamping members 2 secured to the base-block, a safety frame 3 of composite construction, upper clamping members 4 (or 4$^a$) and a plurality of frame bolts 5 connected respectively with the base-block 1 and safety frame 2, which serve to secure the frame members together and also clamp the device to the cross-head members B interposed between the lower and upper clamping members. The base-block 1 provides bearings for said series of suspension sheaves which are arranged in pairs connected to the cables A by means of an equalizing rigging consisting of a double equalizing cable, the strands of which, marked 11 and 12, are anchored at their ends to the base-block and engage in alternation pairs of twin suspension pulleys and pairs of a series of floating equalizing pulleys arranged in loops of the equalizing cable. These pairs of equalizing pulleys are connected by pull bars with the suspension cables A, one pair to each pull bar and cable. Inasmuch as the suspension pulleys, and equalizing pulleys, and equalizing cables are arranged in pairs of twin elements of identical construction, and these pairs function substantially as single elements, in some cases they will hereafter be referred to in the singular, as though each pair were a single member, and in certain aspects of my invention they may be so regarded.

Describing now more specifically the form and arrangement of the members of the device, the base-block 1 (see Figs. 1, 3, 4, 8 and 12) is a casting equipped at its opposite ends with a plurality of bolts 7 which may conveniently consist of steel bolts integrally united to the block by being cast into it. These bolts, six in number at each end, engaged by the nuts 7$^a$, provide means for securing the block securely to the lower clamping bar 2 before mentioned, which in the present instance consists of a strip of angle iron extending transversely of the pair of cross-head channels B—B underneath them. The length of the clamping bars 2 is dependent upon the size and spacing of the cross-head members of the particular style of elevator car, and the depending flange 8 of the bars may vary in width and the distance of the bolt holes formed in it from the top flange 8$^a$ may vary to cause the base block (and the suspension device as a whole) to stand at a desired distance below the level of the channel members.

Between each end of the base-block and the clamping bar 2 at the particular end is interposed a guide plate 50 which is orificed to engage the bolts 7 and is of such width as to just fit between the inner faces of the cross-head channel members B—B, and which serves in installing the equalizing device to center it between such members and maintain it in centered position thereafter.

Adjacent each end the base block is formed with a pair of bolt holes to receive the two-headed frame bolts at that end and by lower intermediate nuts 51, one on each of the four bolts, the block is secured to such bolts.

The base-block is formed with side recesses, marked 9 and 10, to provide for attachment of the twin equalizing cables 11—12 to the block, and is also formed with side openings 13, 14 and 15, providing (together with the recesses 9 and 10) access to the seat for the bearing pins 16 upon which the pairs of twin suspension pulleys 17 and 18 are mounted,—see Fig. 8, illustrating in dotted lines the arrangement of the openings and the bearing pins and pin seats. The bearing pins may conveniently be secured in their seats by means of set screws 19.

The base-block is also formed with vertical openings 20 to receive the suspension pulleys 17 and 18 which are arranged in twin pairs in the angular staggered arrangement best shown in Figure 8. It will be noted that in the present instance the end pair of pulleys 18 are slightly smaller in diameter than the pulleys 17 and that they stand in longitudinal center line of the block whereas the pairs of pulleys 17 are arranged on opposite sides of the center line and are inclined to said line in alternate directions.

The twin equalizing cables 11 and 12 which engage in alternation the suspension pulleys 17 (or 18) and the pairs of twin floating equalizing pulleys hereinafter described are anchored to the base block at one end of the pair at least,—and if desired at both ends,— by means of an equalizing device which acts to distribute the load on the two cables equally while permitting some variation in length of the cables under the strain upon them. In the present instance (see Fig. 6) the equalizing device consists of rope cups 21 secured to the cables and pivotally connected to the inner lower portions of a pair of triangular rocking levers 22—22 which are at their outer lower portions pivoted upon pivot pins 23—23 seated in the base-block and which are connected by a link 24 pivoted to the upper outer portions of such levers. The opposite ends of the cables 11—12 are connected to rope cups which may be of the same construction as the rope cups 21, and are marked 21ª, but which are directly secured by fastening screws 60 to the base-block,—see Figs. 1 and 3.

The equalizing pulleys hereinbefore mentioned, all marked 25, are arranged in front and rear rows of pairs of twin pulleys, the members of each pair engaging the upward loops of the twin equalizing cables 11 and 12, and the different pairs are carried severally by pull bars 26 and 27 which are individually connected to the suspension cables. It will be noted that the pulleys of each row are parallel with each other and that the pulleys of the two rows (regarding each pair in the construction described as a single member) are arranged in alternate divergently inclined herringbone arrangement on opposite sides of the center line of the device,—see Fig. 7. The pull bars 26, which I will for convenience of description term the "front" pull bars (the device being viewed as in Figure 1), are formed at the top with a rearwardly offset socket 28 for attachment to three alternate cables A and at the bottom with an offset bearing portion 29 which is inclined rearwardly and to the right, while the pull bars 27, which may be termed the rear pull bars, have similar forwardly-extending offset sockets 30 for attachment severally to the other three suspension cables, and bearing portions 31 which extend from the rear forwardly toward the right, the bars 26 and 27 thus being not of interchangeable construction but formed as "rights" and "lefts". The bearing portions 29 and 31 of the pull bars are equipped with headed pivot pins 32 upon which the pairs of twin equalizing pulleys 25 are mounted.

Above the cross-head channel members, and forming the upper part of the frame of the device, is the composite safety frame structure before referred to, which includes three parallel frame bars 33, 34 and 35, (see Figs. 2, 3 and 4) spaced apart at their ends by spacing blocks 36 and 37 which at their sides are formed with circular interlocking lugs arranged to seat in orifices in the frame bars, and a plurality of screw bolts 38 which serve to clamp the bars and spacing blocks firmly together. It will be noted that the flat central portions of the bars are arranged in the spaces between the bolts in alternate order on opposite sides of the frame bars, the members of the safety frame thus serving in some measure as guides for the pull bars. The arrangement of the pull bars and inclination of the bearing portions 29 and 31 is such that the flat portions of the bars will normally stand at right angles to the center line of the device and the pulleys will be suspended above the lower, suspension pulleys in position to cause the equalizing cable to track substantially vertically between the two sets of pulleys.

Extending transversely of the frame bars, at each end of the assembled frame bars and opposite the spacing blocks 36—37, are arranged either straight tie bars 4, or bent tie bars 4ª, orificed to engage the bolts 5 and constituting the upper clamping bars of the frame hereinbefore mentioned. The straight tie bars (see Figs. 1 to 4) are employed in case the cross-head channel members B are of such vertical dimensions that the bars 4 can be assembled between such members and the safety bars, whereas if the members B have greater height or vertical dimensions so that the top face of the upper flanges extend above the lower face of the safety frame, the bent tie bars 4ª are employed and are arranged above the safety frame. In case the crosshead channel members are of such height as to extend above the top faces of the safety frame bars, it is obvious that a straight tie, arranged above said bars, may be employed. In either case the tie bars are of such length as to span the space between the outer edges along the top faces of the crosshead members, and the assembled guide frame and associated tie bars are confined together on the frame bolts 5 between upper intermediate nuts 39 and upper nuts 40 on each bolt.

It will be understood that the frame bolts 5, in the normal functioning and use of the machine, sustain no strain, and serve merely to hold the parts in assembled position against sidewise displacement. In event of breakage of the double equalizer cable 11—12, however, the car and the entire equalizer frame with it would descend until the lower faces of the safety frame bars 33, 34 and 35 would bring up against the top faces of the bearing portions 29 and 31 of the pull bars, when the weight of the car would be transferred from the equalizing cables and equalizing pulleys directly to the pull bars through the frame bolts 5 and safety frame.

It is obvious that equalizer devices constructed as above described may be readily manufactured and assembled ready for installation in styles and sizes of elevators in most common use, and that by changes in lower and upper clamping members only,— changes which are very readily effected,— the assembled devices may be adapted for use on other style of cars in which the dimensions and spacing of the cross-head members are different. It is further obvious that in installing the assembled equalizers, the only parts which need be detached are the lower clamping bars 2, and that after loosening up the upper bolts 40 and intermediate nuts 39 on the frame bolts sufficiently to permit the lower clamping members to be re-secured to the base block 1 by the bolts 7ª after the assembly of equalizing members has been lowered between the cross end members B, the upper nuts 40 can be tightened to cause the extreme members of the bolt structure to clamp the upper and lower clamping members to the cross-head members sufficiently to prevent displacement, after which the nuts 39 can be turned up again to add rigidity to the safety frame assembly.

In case it be desired to use my novel equalizing device to connect a car to a group of five cables only, one suspension pulley and one equalizer pulley and associated pull-bar may be omitted, and the equalizer readily adapted to such modified arrangement, as shown in Figs. 11 and 12, in which the right-hand suspension cable A and associated pull-bar, (referring to the position of the parts as illustrated in the other figures) and the right hand pair of equalizer pulleys are omitted. In this arrangement the ends of the twin equalizer cables 11—12 connected to the rope cups 21ª are anchored in proper position by arranging such rope-cup members horizontally underneath the base-block and securing them by engaging their fastening screws 60 in substitute threaded seats formed in the lower face of the block.

The use of two equalizer cables of smaller diameter than a single cable of equivalent strength and which in effect function as a single cable, conduces to greater flexibility and sensitiveness than can be attained by using a single cable engaging single equalizing and suspension pulleys and constitutes an advantage inherent in such construction, while the use of pull-bars connected each to a suspension cable, instead of pull-bars connected centrally to a cross-bar the ends of which are connected to a spread pair of suspension cables, as in certain suspension devices known in the art, enables certain advantages in the way of avoidance of friction, compactness of construction, etc., to be attained which have not heretofore been fully realized.

While the equalizing connection between the elevator car and suspension cables consists, in the device above described, of twin equalizing cables engaging pairs of suspension pulleys and pairs of equalizing pulleys of twin construction, it is obvious that a larger number of equalizing cables engaging groups of corresponding numbers of suspension and equalizing pulleys might be employed, with suitable mechanism for equalizing the strain on the equalizing cables, and I therefore consider plural groups of such members of any number the equivalent of the pairs of members above described and hereinafter mentioned in the claims reciting the double member construction, so far as not inconsistent with limitations in other respects.

I claim:

1. A suspension device for connecting an elevator car to a group of suspension cables including a plurality of pairs of floating equalizing pulleys, each pair being connected to a different suspension cable, a plurality of pairs of suspension pulleys pivotally connected to the car, a pair of strands of equalizing rigging connected to the car engaging said pairs of equalizing pulleys and pairs of suspension pulleys in alternation, and means for equalizing the strain on said strands.

2. A suspension device for connecting an elevator car to a group of suspension cables including a plurality of pairs of floating equalizing pulleys, each pair being connected to a different suspension cable, a plurality of pairs of suspension pulleys pivotally connected to the car, and a pair of equalizing cables engaging said pairs of equalizing pulleys and pairs of suspension pulleys in alternation, said pairs of equalizing cables being connected to the car at their opposite ends and the connection at one end of the pair including a pair of pivoted members connected severally to the cables and a link connecting said pivoted members.

3. A suspension device for connecting an elevator car to a group of suspension cables comprising a plurality of pairs of floating equalizing pulleys connected to said suspension cables, a plurality of pairs of suspension pulleys pivotally connected to the car, a pair of strands of equalizing rigging connected to the car engaging said pairs of equalizing pulleys and pairs of suspension pulleys in alternation, and means for equalizing the strain on said strands.

4. A suspension device for connecting an elevator car to a group of suspension cables including a plurality of pairs of floating equalizing pulleys, each pair being connected to a different suspension cable, a plurality of pairs of suspension pulleys pivotally connected to the car, and a pair of equalizing cables engaging said pairs of equalizing pulleys and pairs of suspension pulleys in alternation, said equalizing cables being connected to the car at their opposite ends and the connection at one end including an equalizing device arranged to equalize the strain on said equalizing cables.

5. A suspension device for connecting an elevator car to a group of suspension cables including a plurality of pairs of floating equalizing pulleys, each pair being connected to a different suspension cable, a plurality of pairs of suspension pulleys pivotally connected to the car, a pair of strands of equalizing rigging engaging said pairs of equalizing pulleys and pairs of suspension pulleys in alteration, one end of each strand being connected to the car, and equalizing means connected to the other ends of said strands arranged to equalize the strain upon them.

6. A suspension device for connecting a group of suspension cables to an elevator car having at its top a pair of spaced crosshead members, said device comprising a lower pair of clamping bars extending transversely underneath said crosshead members and an assembly of equalizing members arranged to be installed from above downwardly between said crosshead members, said assembly comprising a base block arranged to be removably secured to said lower clamping bars, suspension pulleys mounted in said base block, frame bolts secured to said base block, a safety frame secured to said frame bolts, upper clamping members carried by said safety frame cooperating with said frame bolts, pull bars arranged to be connected above said safety frame to the suspension cables, equalizing pulleys pivoted to the lower end of said pull bars below said safety frame, and an equalizing cable secured at its opposite ends to said base block and arranged to engage said equalizing pulleys and said suspension pulleys in alternation.

7. A suspension device for connecting a group of suspension cables to an elevator car having at its top a pair of spaced crosshead members, said device comprising a lower pair of clamping bars extending transversely underneath said crosshead members and an assembly of equalizing members arranged to be installed from above downwardly between said crosshead members, said assembly comprising a base block arranged to be removably secured to said lower clamping bars, suspension pulleys mounted in said base block, frame bolts secured to said base block, a safety frame secured to said frame bolts, upper clamping members carried by said safety frame cooperating with said frame bolts, connecting members arranged to be connected to said suspension cables, equalizing pulleys pivotally mounted in said connecting members below said safety frame, and an equalizing cable secured at its opposite ends to said base block and arranged to engage said equalizing pulleys and said suspension pulleys in alternation.

8. In a suspension device of the character described, a safety frame and pull bar assembly including a set of three horizontally disposed parallel flat frame bars, spacing blocks severally arranged adjacent the ends of said bars, said blocks being arranged to make interlocked engagement with said frame bars, a series of bolts arranged to clamp said frame bars and blocks together, and pull bars having each a flat central portion and an upper offset socket portion and a lower offset bearing portion, said pull bars being arranged in the spaces between said bolts in alternate order on opposite sides of the central frame bar.

9. In a suspension device of the character described, a safety frame and pull bar assembly including a set of three horizontally disposed parallel flat frame bars, means for securing said frame bars together in spaced relation including a series of cross members, and pull bars having each a flat central portion and an upper socket portion and an offset lower bearing portion, said pull bars being arranged in the spaces between said cross members in alternate order on opposite sides of the central frame bar.

10. A safety frame and pull bar assembly according to claim 9 in which said means for securing the frame bars together in spaced relation includes spacing blocks adjacent the ends of said bars formed with lugs arranged to engage orifices formed in said bars, and in which the cross-members are bolts arranged to clamp the frame bars and blocks together.

11. In a suspension device for connecting a group of suspension cables to an elevator car having at its top a pair of spaced crosshead members, a base-block provided with bearings for a set of suspension pulleys, clamping bars which extend transversely underneath said cross-head members and which are removably secured to the ends of said base-block, whereby said clamping bars may be interchanged with other clamping bars of different dimensions, upper clamping members arranged to engage the upper faces of said cross-head members, and bolts disposed between said cross-head members engaging said base-block and arranged to clamp said clamping bars and upper clamping members to said cross-head members.

12. A suspension device having the structure recited in claim 11 and in which the clamping bars are bolted to the ends of the base-block and guide plates are interposed between the ends of the base-block and the clamping bars.

13. A suspension device according to claim 7 in which upper and lower intermediate nuts are provided on the frame bolts arranged to secure the base-block to the bolt at its lower end and to secure the safety frame and upper clamping members to the bolts at its upper end, and in which the extreme members of the bolt structure are arranged to clamp the device to the cross-head members of the car.

14. A suspension device according to claim 7 in which the upper clamping members are straight orificed bars arranged beneath the safety frame members and are engaged by the bolts.

15. A suspension device according to claim 6 in which the upper clamping members are formed with an orificed offset bend extending above and engaging the safety frame and the orifices are engaged by the bolts.

16. In a suspension device of the character described and including a pair of equalizing cables, a mechanism for equalizing the strain on said cables comprising rope cups severally secured to adjacent ends of said pair of cables, a pair of bell crank levers pivoted on the frame of the device and having horizontal portions extending towards each other pivoted to said rope cups and having vertical portions, and a link connecting said vertical portions.

17. A suspension device for connecting a group of six suspension cables to an elevator car including six upper floating pulleys connected to the cables and five lower pulleys mounted in bearings in the frame of the device, said frame being fixed to the car, and an equalizing cable secured at its opposite ends to one end of said frame and engaging said lower pulleys and said upper pulleys in alternation, two of said lower pulleys being arranged parallel to each other on one side of the device and being disposed in vertical planes inclined in one direction from the center line of the device and two others being arranged parallel to each other on the other side of said center line and oppositely inclined and the remaining one of said lower pulleys being disposed in a central vertical plane, and said upper pulleys being suspended above said lower pulleys in position to cause the equalizing cable to track vertically between said lower and upper pulleys, whereby the path of the equalizing cable will extend from its two points of attachment at said one end of the device in a zigzag path lying on opposite sides of the center of the device.

18. A suspension device for connecting a group of suspension cables to an elevator car including a group of upper floating pulleys severally connected to the cables, and a set of lower pulleys mounted in stationary bearings fixed to the car, and an equalizing cable secured at its ends to the car and arranged to track between said upper and lower pulleys in alternation, said upper pulleys being suspended in front and rear rows and the pulleys of each row being parallel with each other and arranged in alternate diver-gently inclined herringbone arrangement on opposite sides of the center line of the device.

In testimony whereof, I have subscribed my name.

WILLIAM P. FROST.